Patented Jan. 12, 1932

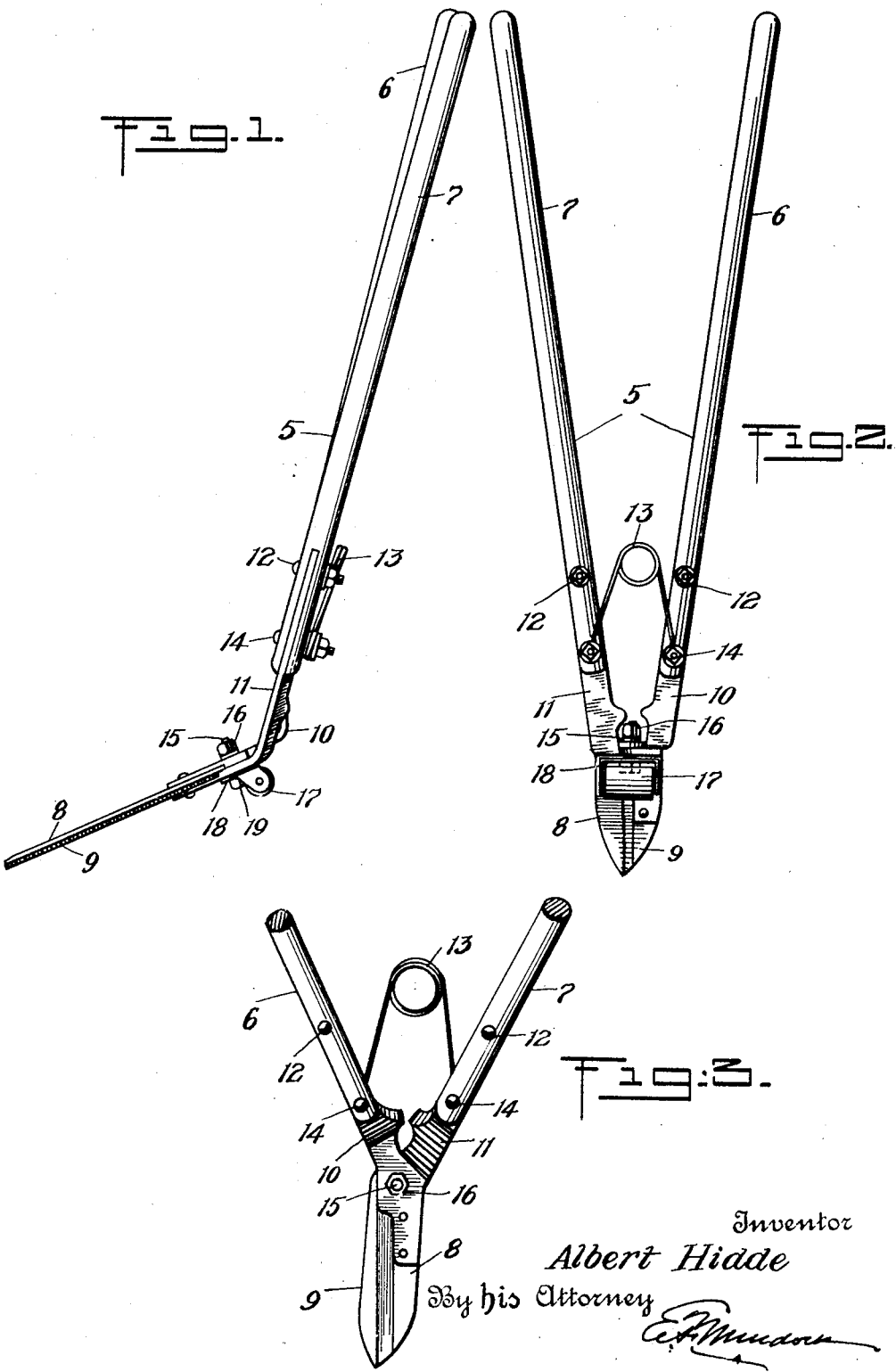

1,841,121

UNITED STATES PATENT OFFICE

ALBERT HIDDE, OF MAPLEWOOD, NEW JERSEY, ASSIGNOR TO H. BOKER & CO., INC., OF NEW YORK, N. Y., A CORPORATION OF NEW YORK

GRASS SHEARS

Application filed February 21, 1930. Serial No. 430,197.

This invention relates to shears, and more particularly to shears for cutting grass.

Objects

Among the principal objects of the invention are: To provide improved shears having elongated handles to easily and accessibly cut grass; to provide means for readily maintaining the shears in proper relationship to the ground; to provide means whereby the shears will maintain a free movement on the ground, and to permit an even cutting level; to provide means to operate the shears with an easier and smoother action; to secure simplicity of construction, and to obtain other advantages and results as may be brought out in the following description.

In the drawings:—

Figure 1 is an edge view of my improved grass shears,

Figure 2 is a view looking at the back of the shears, and

Figure 3 is a plan view looking down on the shears.

Description

In the specific embodiment of the invention illustrated in said drawings, the reference numeral 5 indicates my improved shear for cutting grass. Heretofore, grass cutting shears have been constructed with short handles, thereby making it a hardship and necessity of the operator to reach down with difficulty while cutting grass, and usually failed to obtain the desired results. However, in my improved shear 5, I provide a pair of elongated wooden handles 6, 7 having attached at their lower adjacent ends a pair of cooperating cutting blades 8, 9. Means for attaching the cooperating blades to the handles are in the form of shanks 10, 11, suitably held in recesses provided in the handles. The shanks 10, 11 are preferably constructed integral with the blades of drop-forged steel, thereby making them unbreakable and permit long use. The shanks are shown herein as rectangular, and the handle recesses are shown as saw slits cut a distance upward from the lower ends of the handles 6, 7. As one means for holding the shanks in the recesses of the handles are shown a plurality of bolts 12 which pass from one side of the handles through the shanks and out on the other side of the handles thereby not only securely holding the cutting blades to the handles, but reinforcing the handles at the slit portions thereof by clamping the same to the shanks.

In order that a free and easy movement may be obtained while operating the shears for cutting grass around flower-beds, hedges and the like, I have provided means in the form of a strong durable spring 13 suitably and securely fastened to the handles 6, 7. This spring 13 is so placed on the handles that very little exertion is required to operate the handles when in operation. In the present disclosure the spring is fastened adjacent the ends of the handles to which the cutting blades 8, 9 are attached. To securely hold the spring to the handles, I provide bolts 14, the said bolts likewise permit the shanks 10, 11 to be more firmly held to the handles.

The cooperating cutting blades 8, 9, are pivoted as at 15 by a bolt 16. In the particular showing herein, one blade 8 is provided with a sharpened beveled edge, while the blade 9 is provided with a beveled serrated edge. When the blades are in cooperating position, a clean and positive cutting of grass or the like may be obtained.

In order that grass on hilly and uneven ground may be readily and evenly cut, means are provided to obtain a support for, and constant spacing of, the blades from the ground. Ordinarily such a support and spacing means would be placed on the underside of the heel or pivoted on the shears in carrying out my invention. Said means, furthermore may be in the form of a roller 17 and pivotally mounted to the shears through a supporting member or swivel 18 by a stud bolt 19. The swivel 18 is provided with an opening slightly larger than the bolt shank, and the bolt is shouldered to space the head thereof from the shears, which permits a swinging movement of the swivel on the bolt.

The bolt is shaped to support the roller in offset relationship to the axis of the bolt so the roller will follow along depending on the user in operating the shears 5. This roller is of very special advantage when going over uneven ground and in swinging underneath overhanging flowers, and in many other uses, thereby permitting a better and cleaner cutting and a simpler and more efficient operation.

Claims:

1. In a device as characterized, a grass shears comprising cutting blades and a pair of handles for operating the same, and a swivelled roller for spacing the blades with respect to the ground.

2. In a device as characterized, a grass shears comprising cutting blades and a pair of handles for operating the same, a roller on the bottom of said shears, and a swivel support for said roller.

3. In a device as characterized, a grass shears comprising cutting blades and a pair of handles for operating the same, a roller on the bottom of said shears, and a swivel support for said roller, the axis of said roller and of the swivel being non-intersecting so the roller will follow behind the axis of the swivel when the shears are moved with the roller on the ground.

4. In a device as characterized, a grass shears comprising a pair of pivotally mounted elongated handles, cutting blades secured to the lower ends of said handles, and a spring attached adjacent the lower ends of the handles to permit easy movement when operating the shears.

5. In a device as characterized, a grass shears comprising a pair of pivotally mounted elongated handles, cutting blades secured to the lower ends of said handles, a spring attached adjacent the lower ends of the handles to permit easy movement when operating the shears, a swivel secured to the bottom of the shears, and a roller mounted to said swivel for spacing the blades with respect to the ground.

ALBERT HIDDE.